No. 622,396. Patented Apr. 4, 1899.
F. H. ROBERTS.
CONFECTIONERY PACKAGE.
(Application filed June 23, 1898.)
(No Model.) 2 Sheets—Sheet 1.

WITNESSES
INVENTOR

No. 622,396. Patented Apr. 4, 1899.
F. H. ROBERTS.
CONFECTIONERY PACKAGE.
(Application filed June 23, 1898.)

(No Model.) 2 Sheets—Sheet 2.

WITNESSES
INVENTOR

UNITED STATES PATENT OFFICE.

FRED HENRY ROBERTS, OF SOMERVILLE, MASSACHUSETTS.

CONFECTIONERY-PACKAGE.

SPECIFICATION forming part of Letters Patent No. 622,396, dated April 4, 1899.

Application filed June 23, 1898. Serial No. 684,229. (No model.)

*To all whom it may concern:*

Be it known that I, FRED HENRY ROBERTS, a citizen of the United States, residing at Somerville, in the county of Middlesex and State of Massachusetts, have invented a new and useful Improvement in Confectionery-Packages, of which the following is a full, clear, and exact description, reference being had to the accompanying drawings, forming a part of this specification, in explaining its nature.

The invention relates to a package of confectionery prepared for transportation and sale and including a tray or receptacle upon which a selected portion of the confectionery is arranged by the manufacturer in any desired attractive order or arrangement for exhibition to customers by the retail dealer, and also one or more boxes or receptacles for holding confectionery of the same kind in bulk and from which the confectionery is sold by the retailer before that exhibited upon said tray is sold, the exposing-tray and the supply box or boxes, with their confectionery, being packed for transportation in a single box common to all.

Figure 1:
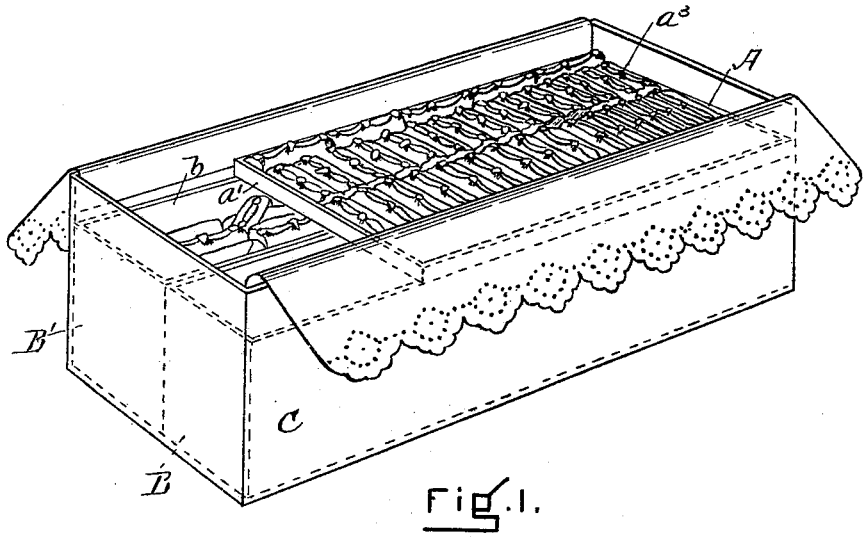
Figure 2:
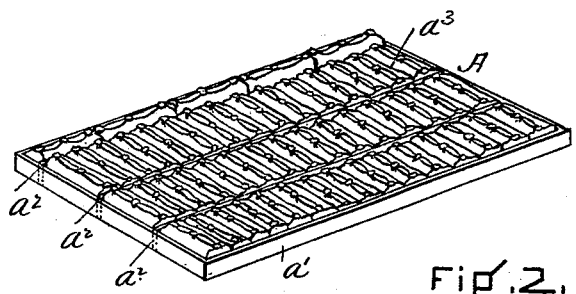
Figure 3:
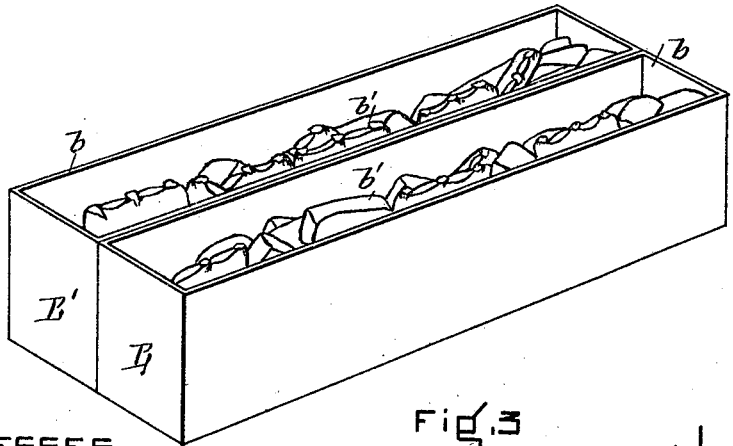
Figure 4:
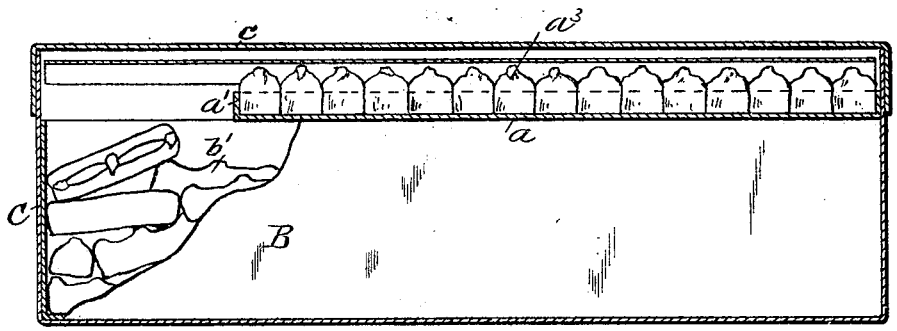
Figure 5:
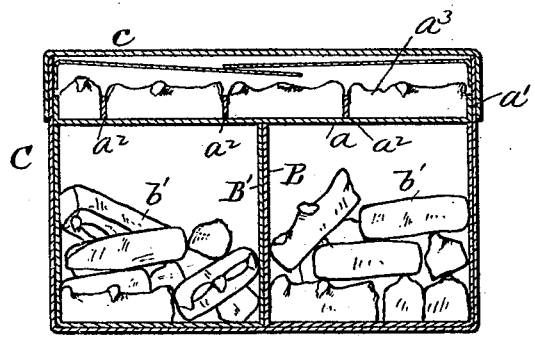

In the drawings, Figure 1 represents in perspective a view of the package of confectionery with the cover of the shipping-box removed. Fig. 2 is a view in perspective of the packed exhibiting-tray removed. Fig. 3 is a view in perspective of the packed supply-boxes removed. Fig. 4 is a view, principally in longitudinal section, of the package with the cover applied to the shipping-box, the side of the supply-box being removed to show the confectionery in it. Fig. 5 is a view in cross vertical section of the complete package.

Referring to the drawings, A represents a shallow tray or receptacle, preferably, though not necessarily, made of pasteboard and preferably having a flat bottom $a$ and a raised wall $a'$ about its edges. It may also be divided into sections by division-walls $a^2$. The tray may be rectangular, square, or of any desired shape, and in it there is packed at the manufacturer's or wholesale dealer's or place of origin of the goods pieces of confectionery $a^3$ in an order or arrangement calculated to display the confectionery in an attractive manner to customers of the retail seller when exposed for sale. Ordinarily the pieces are packed upon the tray between the walls in one layer and in regular lines, with their ornamental tops uppermost, substantially as represented in Fig. 2, and for the better spacing of the lines and also for the more regular holding of the confectionery and also for the purpose of preventing it from being injured in transportation or use the division-walls $a^2$ may be employed. The tray thus packed or supplied with confectionery for show is not intended for use by the retailer or seller as a device from which to sell the confectionery, but as a means by which he may exhibit the confectionery continuously to customers in the most attractive form. It is well known to manufacturers and wholesale dealers of confectionery that many retailers and other sellers have very little knowledge of how confectionery should be displayed for sale and sold in a manner to properly and attractively display it and in a continuously-tempting manner and at the same time to use as little of it as possible for that purpose in order that it may not become hard and stale when exposed to the light and air, and this manner of preparing confectionery for exposure and sale is intended not only to relieve the retailer or seller from the trouble of arranging it for sale or attempting to so arrange it, but to also supply him with the goods arranged in a more tasty and elaborate way than the retailer or seller would ordinarily employ. Another benefit arising from this method of arranging the confectionery is that the retail dealer or seller must be provided with additional confectionery of the kind displayed by the tray with which to fill orders, as he cannot well take it from the tray without disturbing the ornamental appearance of the same, and it is not intended that it shall be sold from the tray; but such confectionery prepared for sale only need not be packed with special reference to display, but only with special reference to maintaining its shape and condition. It therefore may be put up in bulk in boxes of a size and shape designed to best maintain its freshness and in not too large quantities. I therefore prefer to include with the packed tray at least two supply-boxes containing confectionery in bulk. I do not, however, confine myself to this number of supply-boxes. In the drawings I have represented two, B being one box, and B' the other box. These boxes are preferably of the same size and are also preferably long, deep, and narrow and preferably have open tops b—that is, it is not necessary that they be provided with covers. The confectionery b', which they contain, is carried in bulk by them—that is, it is not arranged for exposure and display—and very little care and expense are necessary in filling them. They have a large number of layers, where the tray has one, and they are adapted to hold a much larger quantity than is displayed on the tray.

Commonly confectionery is put up for sale to retailers in five-pound boxes, and I prefer in practicing my invention to proportion the boxes and tray to each other, so that each supply-box shall contain about two pounds of the loose confectionery from which to sell and the tray about one pound of the confectionery exposed for sale. The two supply-boxes and the tray are contained in a shipping-box C, which is of a length and width to receive the two supply-boxes and to relatively firmly hold them, and which is also of a height to not only hold the supply-boxes, but also the tray, which is placed upon the supply-boxes and which is of the width of the two supply-boxes, but generally not of their length. (See Fig. 1.) The supply-boxes are not filled to above their top, so that their top edges act as rests or supports for the bottom of the tray, and the tray thus acts in a measure to hold the confectionery in the supply-boxes and prevent it from leaving them or from being injured by the knocking about or movement of the shipping-box, while the tray is near enough to the cover c of the shipping-box when in place within it to have its packed confectionery held in place by said cover and by an interposed layer of soft packing material, which may be used when desired.

It is intended that the package of confectionery shall be used by the retailer in the following way: Upon the reception of a full five-pound box or the opening of a fresh five-pound box the tray of prepared confectionery is taken out and placed upon a conspicuous stand or in a conspicuous place in order to display the carefully packed and prepared confectionery it holds, and it generally replaces a similar tray of the same kind of confectionery which was last opened. Stands for the reception of trays of confectionery of the arrangement herein specified are in use, and such stands generally have a holding-support of the size of the tray, and they are also arranged to support three or four packed trays of other confectionery at different levels in order that different kinds of confectionery may be displayed together. They are also provided with receptacles for holding generally one supply-box of each kind of the confectionery displayed by the various trays, or, if desired, those having three trays having three of the supply-boxes. Those having four trays, however, may have but two supply-boxes, in which case each supply-box may be divided into two parts in order that four receptacles for holding the confectionery which is sold may be had. At the same time that the fresh tray is placed in position and the old tray and its confectionery removed a supply-box of the fresh confectionery is also taken from the shipping-box, and any unused confectionery in the old supply-box and the confectionery from the old tray is removed and put on top of the fresh supply-box and is sold from the supply-box before the fresh confectionery which it contains is sold.

It will be understood that the supply-boxes are not entirely filled, but have left a space sufficient to receive the confectionery of the old tray or a large part of it.

It will thus be seen that not only is there arranged by my invention a desirable way of preparing confectionery for sale and for keeping it fresh until sold, but also that a system is established by which the retailer has the displayed confectionery prepared for him and in such a way that without requiring any effort upon his part that exchange which is necessary for maintaining the freshness of the confectionery by the substitution of the new confectionery for the old is almost automatically practiced by him or his clerk. That this is the case will be seen from the fact that when a fresh five-pound box of confectionery is opened there will be in existence two packed display-trays—the old one, which is upon the stand, and the new one in the box—and this compels the retailer or clerk to dispose of one of them, and of course the one that is disposed of is the one that has been longest open.

The tray is intended to be of ornamental but of cheap material, so that after it has been once used it may be thrown away. This is a desirable feature, because it insures a cleanliness of the holder under all circumstances and which would not necessarily follow if the tray were reused. The second supply-box is held in the shipping-box until the first has been sold, when the first is removed from its selling position and replaced by the second.

The advantages of the invention have been indicated in connection with the description and need not be further elaborated here. I would say, however, that I of course reserve the right to any mechanical equivalents for the invention which I have shown and set forth and consider within such equivalency any prepared packages or box of confectionery which shall contain confectionery in bulk for immediate sale at retail and a removable exposing-tray upon which the confectionery has been carefully and ornamentally packed at the place of manufacture or at the wholesaler's and which is subsequently used for exhibiting and displaying the confectionery at the place of sale of the kind contained in the box for sale, while the selling is done from the box.

Having thus fully described my invention, I claim and desire to secure by Letters Patent of the United States—

1. The confectionery-package above described comprising a shipping-case containing two or more supply-boxes to hold confectionery in bulk, and a tray adapted to rest on said supply-boxes, and of a depth sufficient to contain a layer of confectionery symmetrically arranged, the depth of said tray and of said supply-boxes together being substantially equal to the depth of the interior of said shipping-case, as set forth.

2. As a new article of manufacture, the confectionery-package above described comprising a shipping-case provided with a cover and containing two or more supply-boxes filled with confectionery in bulk, said boxes being of a less depth than said shipping-case, and a display-tray sufficiently deep to contain a layer of confectionery symmetrically displayed and resting on said supply-boxes, said tray and said supply-boxes together substantially filling the depth of said shipping-case between the inside of its cover and its bottom.

FRED HENRY ROBERTS.

Witnesses:
F. F. RAYMOND, 2d;
J. M. DOLAN.